US012808443B2

(12) United States Patent
Bottura

(10) Patent No.: US 12,808,443 B2
(45) Date of Patent: Nov. 24, 2026

(54) EXCHANGER TAP, PARTICULARLY FOR REFRIGERATION CYCLE PLANTS

(71) Applicant: OLAB S.R.L., Torbole Casaglia (IT)

(72) Inventor: Cesare Bottura, Brescia (IT)

(73) Assignee: OLAB S.R.L., Torbole Casaglia (IT)

( * ) Notice: Subject to any disclaimer, the term of this patent is extended or adjusted under 35 U.S.C. 154(b) by 0 days.

(21) Appl. No.: 19/056,006

(22) Filed: Feb. 18, 2025

(65) Prior Publication Data

US 2025/0314308 A1 Oct. 9, 2025

(30) Foreign Application Priority Data

Apr. 4, 2024 (IT) ........................ 202024000001456

(51) Int. Cl.
*F16K 11/044* (2006.01)
*F16K 17/06* (2006.01)
*F16K 27/02* (2006.01)
*F25B 41/24* (2021.01)

(52) U.S. Cl.
CPC ........ *F16K 11/044* (2013.01); *F16K 27/0263* (2013.01); *F16K 17/06* (2013.01); *F25B 41/24* (2021.01)

(58) Field of Classification Search
CPC .... F16K 11/044; F16K 17/06; F16K 27/0263; F16L 37/148; F25B 2500/07; F25B 41/24
See application file for complete search history.

(56) References Cited

U.S. PATENT DOCUMENTS 2,645,243 A * 7/1953 Turner .................... F16K 17/34 137/513.7
5,462,086 A * 10/1995 Taylor ................... F16K 17/048 137/865
10,591,071 B2 * 3/2020 Kruppe ................. F16K 17/048
11,143,348 B2 * 10/2021 Chung .................... F16L 21/02
2019/0331019 A1 * 10/2019 Wang ...................... F01P 7/165

* cited by examiner

*Primary Examiner* — Hailey K. Do
(74) *Attorney, Agent, or Firm* — Amster, Rothstein & Ebenstein LLP

(57) ABSTRACT

An exchanger tap, particularly for refrigeration cycle plants, which comprises a tap body provided with a main body and a secondary body, which are respectively adapted to be connected to a first and to a second safety valve, and an inlet adapted to be coupled to a refrigeration cycle plant; at least the inlet adapted to be connected to the refrigeration cycle plant is provided with a rotatable ring for screwing the tap to the refrigeration cycle plant, the ring being rotatable with respect to the body of the tap.

7 Claims, 6 Drawing Sheets

EXCHANGER TAP, PARTICULARLY FOR REFRIGERATION CYCLE PLANTS

The present invention relates to an exchanger tap, particularly for refrigeration cycle plants. More specifically, the invention relates to an exchanger tap that simultaneously allows the use of a pair of safety valves.

As is known, an exchanger tap is a device commonly used in refrigeration cycle plants, and its function is to act as a service tap for a pair of safety valves, simultaneously allowing one valve to be used and the other valve to be locked out. Using this exchanger tap, the user can intervene on the valve that is locked out, in order to perform for example periodic checks and/or substitution, while ensuring the operation of the plant under maintenance, as the other valve remains fully operational.

FIGS. 1, 2 and 3 show an exchanger tap in the prior art. In these figures, the exchanger tap is designated by the reference numeral 1, and comprises a tap provided with a main body 3 to which a safety valve 4 is adapted to be coupled, and a secondary body 5 to which a second safety valve 6 is adapted to be coupled.

The tap body further comprises an inlet 7 for attaching to a plant.

Inside the tap body, an internal slider 8 can move and can pass from a position in which the safety valve 4 is made operational, as illustrated in FIG. 2, to a position, shown in FIG. 3, in which the second safety valve 6 is operational.

The attachment of the exchanger tap body to the controlled plant is provided, according to the prior art in FIGS. 1-3, by way of a conical male threading 10 integrated in the main body of the tap. The advantage of this type of connection is that it is very simple in terms of construction, but it still presents a number of drawbacks.

Firstly, it requires having sufficient maneuvering room for the assembly, as the entire tap 1 must be able to rotate about the axis of screwing.

Furthermore, at the connection between the exchanger tap 1 and the plant, the seal is effected by means of an anaerobic sealant, and therefore the seal quality depends on its design lifetime and on the conformance of its application process.

Finally, the angular position of the tap, once assembled, cannot be defined in advance, and instead depends on the coupling tolerance between the male and female parts of the conical threaded connection 10.

The aim of the present invention is to provide an exchanger tap, particularly for refrigeration cycle plants, that does not require a specific amount of room to maneuver for assembly.

Within this aim, an object of the present invention is to provide an exchanger tap, particularly for refrigeration cycle plants, that makes it possible to eliminate the use of anaerobic sealants for the joins between the tap and the refrigeration cycle plant.

Another object of the present invention is to provide an exchanger tap, particularly for refrigeration cycle plants, that makes it possible to avoid the problems of coolant gas leakage in the plant as a consequence of degradation over time of such anaerobic sealants.

Another object of the present invention is to provide an exchanger tap, particularly for refrigeration cycle plants, that is highly reliable, easily and practically implemented, and at low cost.

This aim and these and other objects which will become better apparent hereinafter are achieved by an exchanger tap, particularly for refrigeration cycle plants, which comprises a tap body provided with a main body and a secondary body, which are respectively configured to be connected to a first and to a second safety valve, and an inlet configured to be coupled to a refrigeration cycle plant, wherein at least said inlet configured to be connected to a refrigeration cycle plant is provided with a rotatable ring for screwing said tap to said refrigeration cycle plant, said ring being rotatable with respect to the tap body.

Further characteristics and advantages of the invention will become better apparent from the description of preferred, but not exclusive, embodiments of the exchanger tap according to the present invention, which are illustrated by way of non-limiting example in the accompanying drawings wherein.

Figure 1:
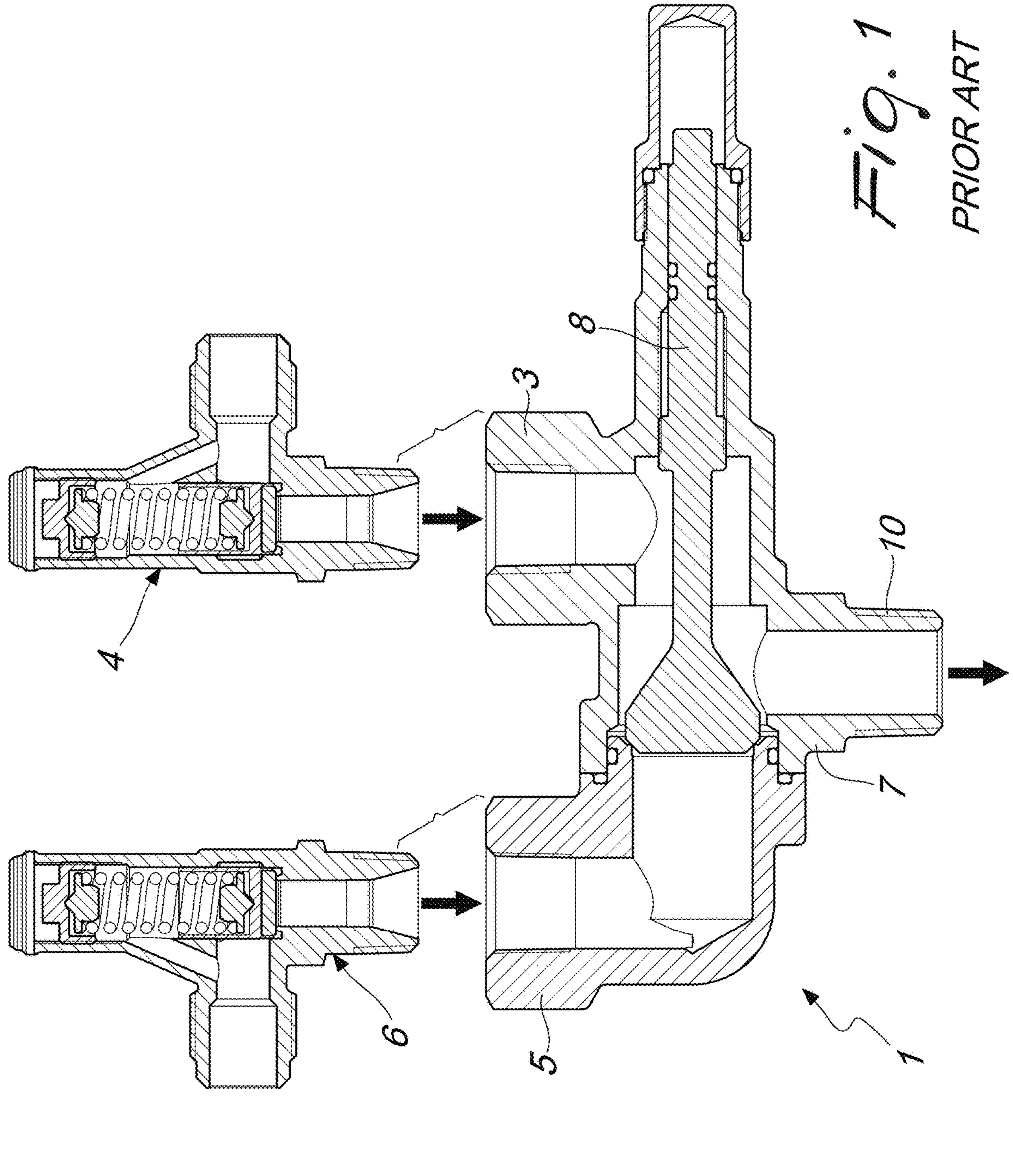
Fig. 1 PRIOR ART
FIG. 1 is an exploded longitudinal cross-sectional view of an exchanger tap according to the prior art.
Figure 2:
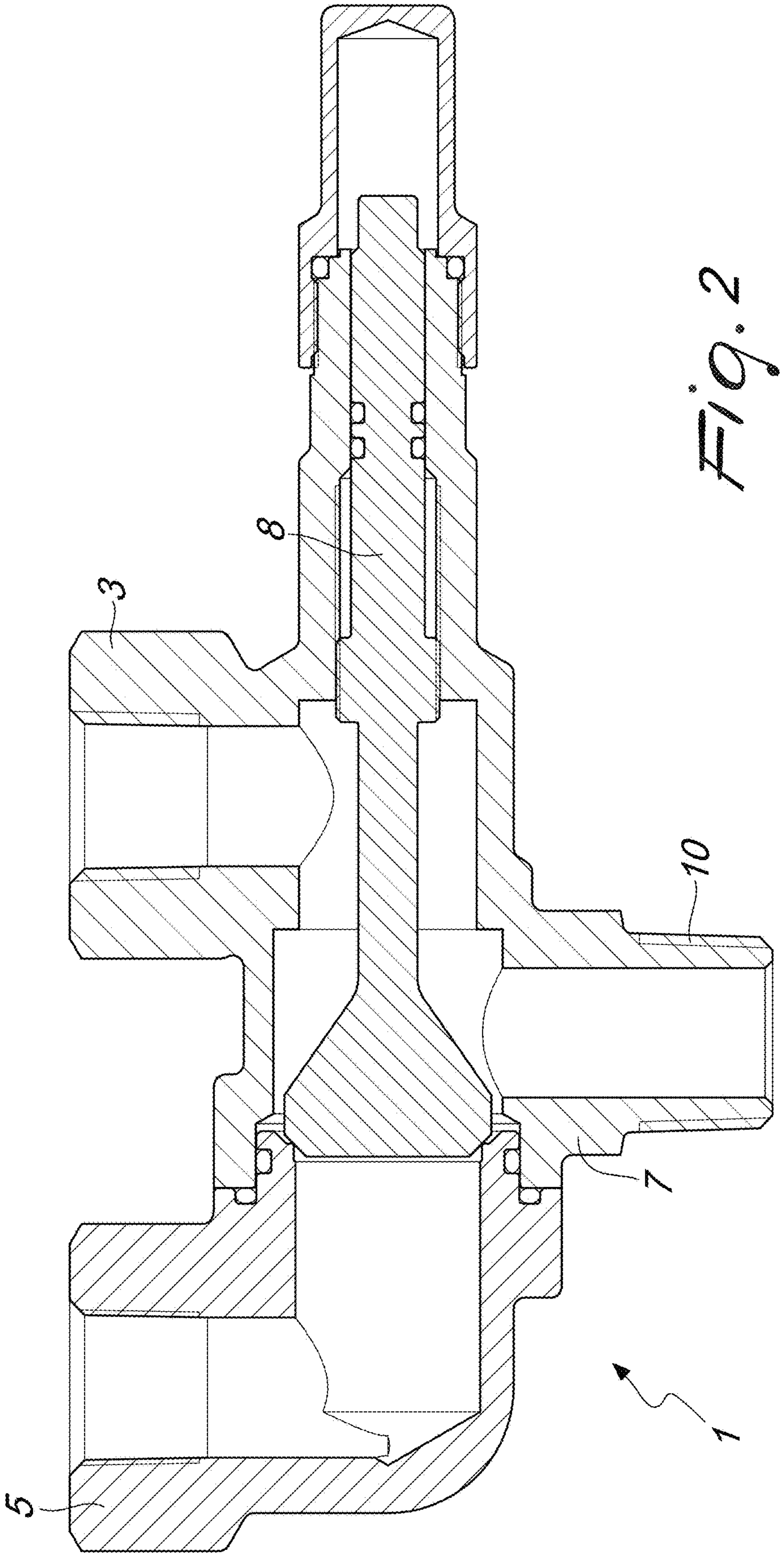
Fig. 2 PRIOR ART
FIG. 2 is a longitudinal cross-sectional view of the exchanger tap of FIG. 1 in a first operating configuration.
Figure 3:
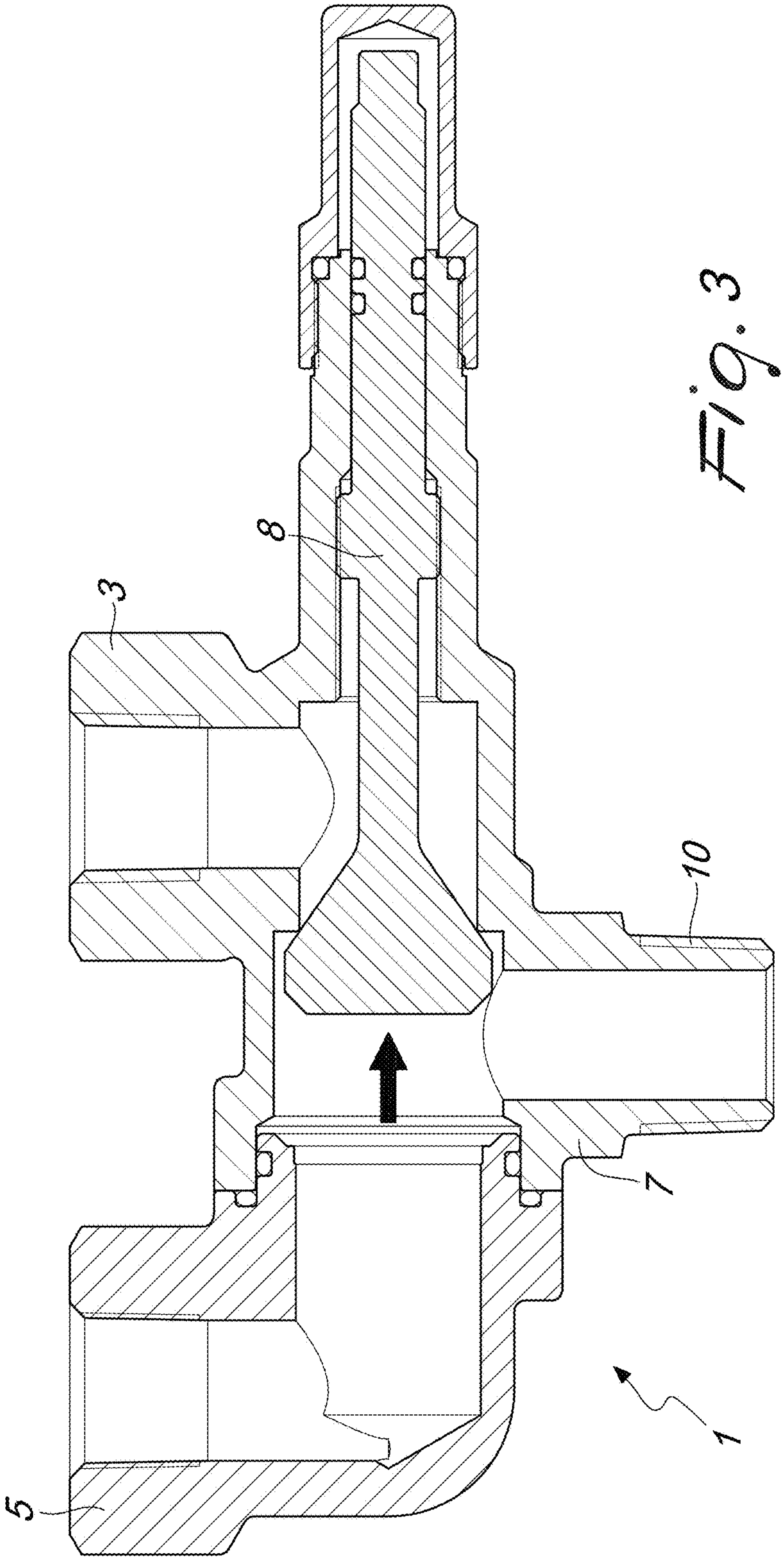
Fig. 3 PRIOR ART
FIG. 3 is a longitudinal cross-sectional view of the exchanger tap of FIGS. 1 and 2 in a second operating configuration.
Figure 4:
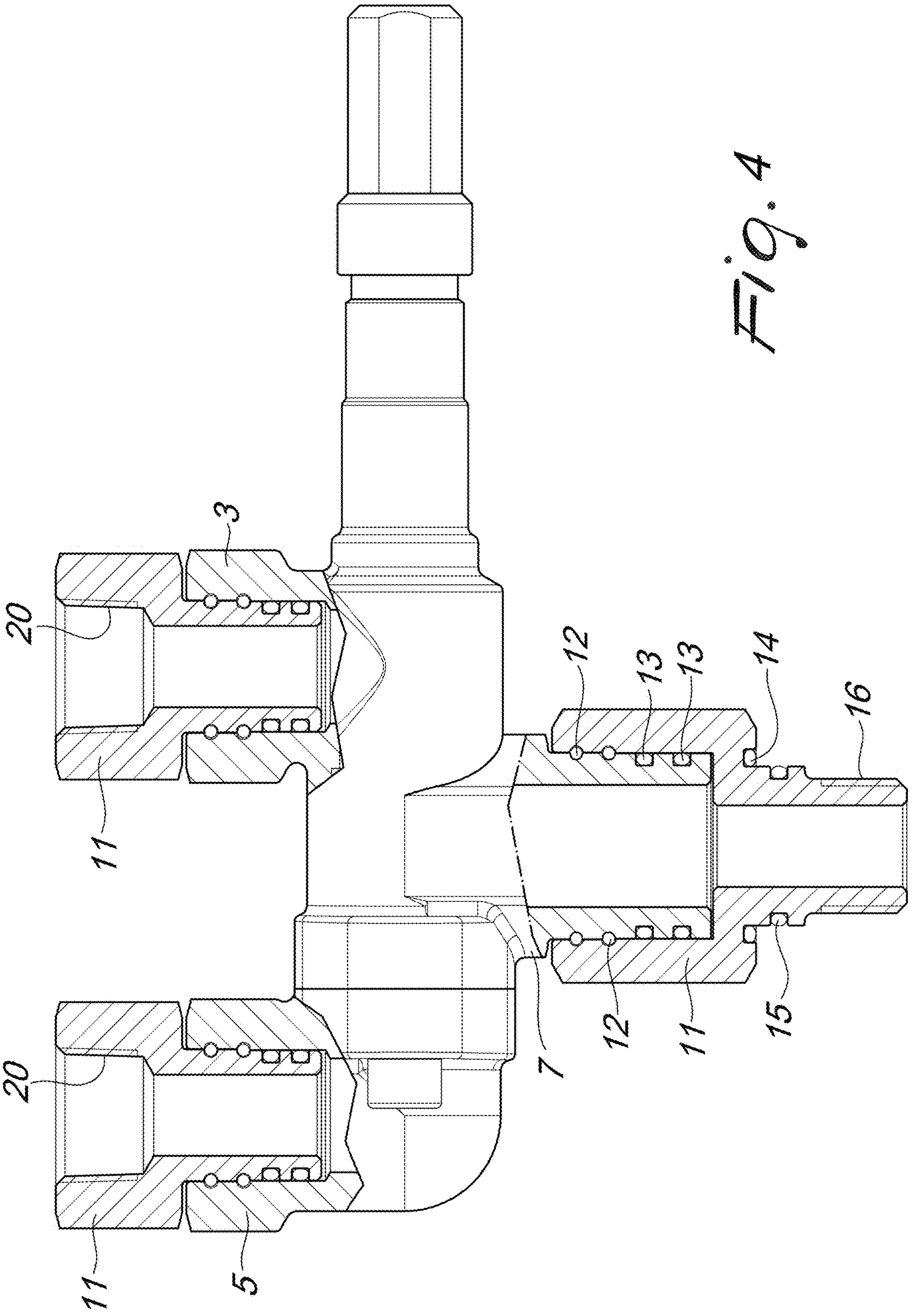
FIG. 4 is a partially cross-sectional side view of the exchanger tap according to the present invention.

With reference to the figures, in which identical reference numerals refer to identical elements, the exchanger tap according to the present invention, generally designated by the reference numeral 1, comprises a tap body provided with a main body 3 and a secondary body 5, to which safety valves 4 and 6 are adapted to be coupled by screwing, as illustrated in FIG. 1.

Conveniently, the exchanger tap body further comprises an inlet 7 which is adapted to connect the tap to a refrigeration cycle plant.

The inlet 7, just as with the main body 3 and the secondary body 5, has a rotatable ring 11 that is capable of mechanically decoupling the tap body from the ring itself which, in rotating, by contrast provides a fixed connection of the tap to the plant.

The rotatable ring 11 is fitted with a double internal O-ring 13, providing a radial seal toward the tap side, while toward the plant side there are two O-rings 14 and 15, one providing a radial seal and the other providing an axial seal.

The reference numeral 12 designates two steel wires interposed between the tap body and the ring 11, which are adapted to ensure the axial coupling between body and ring.

The coupling of the rotatable ring 11 occurs by screwing the threading 16 of the ring 11 with the refrigeration cycle plant.

Similar rings 11 are provided for the main body 3 and the secondary body 5, which enable the coupling, via threading 20, to the safety valves 4 and 6.

Figure 5:
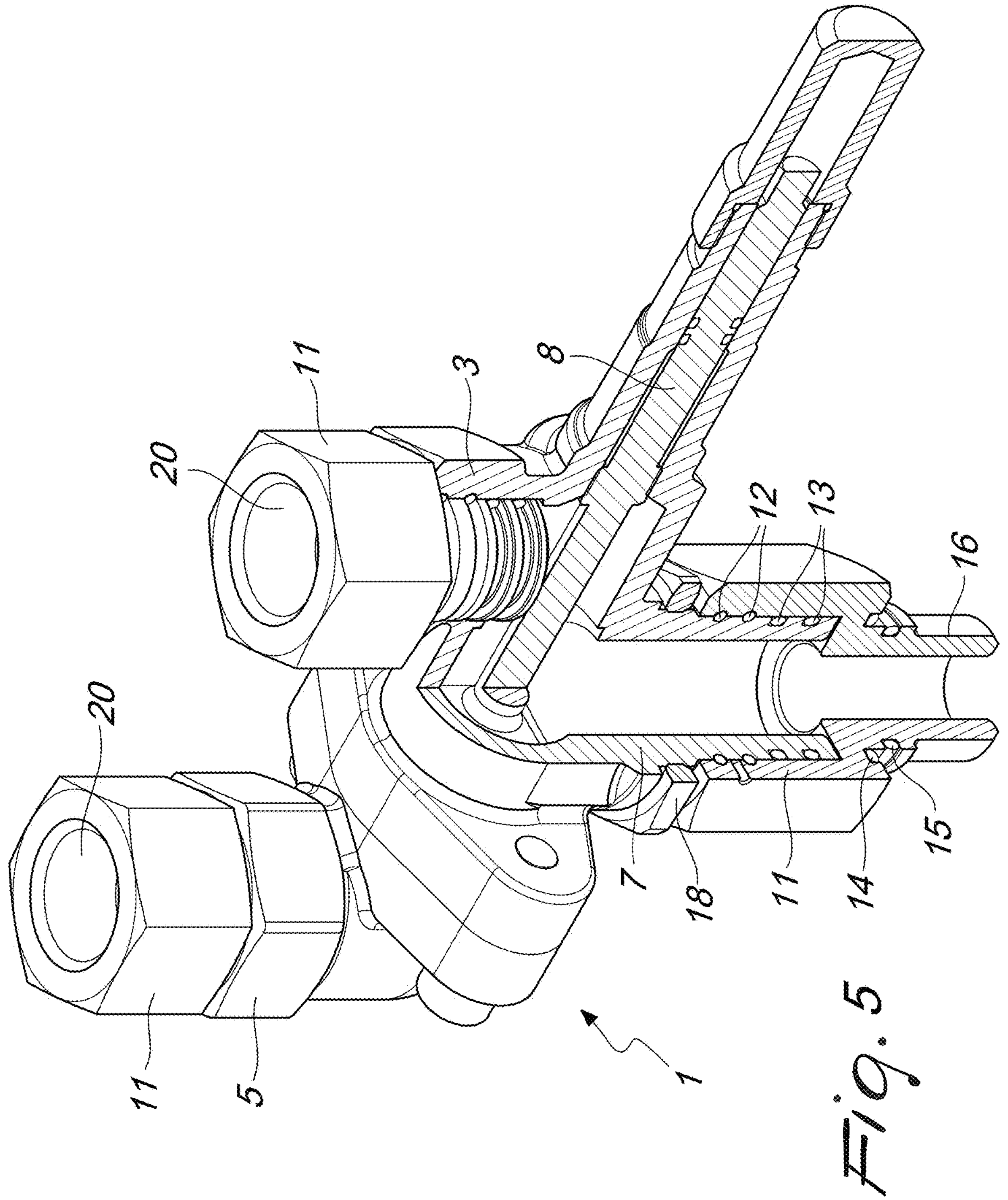
FIG. 5 is a partially cutaway perspective view of the exchanger tap according to the present invention according to a first variation of embodiment thereof.
Figure 6:
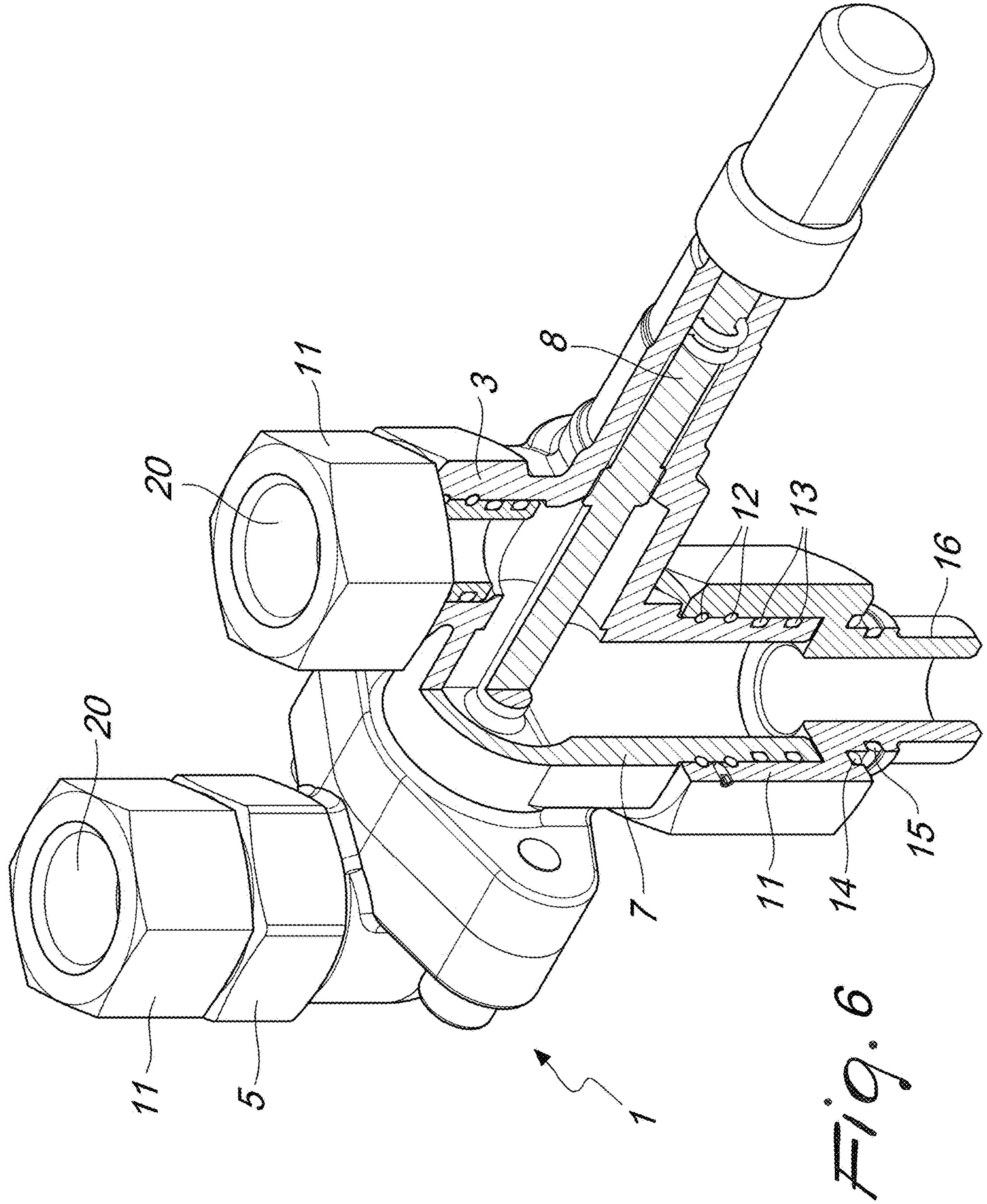
FIG. 6 is a partially cutaway perspective view of the exchanger tap according to the present invention according to a second variation of embodiment thereof.

Conveniently, the rotatable ring 11 is provided with locking means for locking its radial position, which can be constituted for example by a grub screw or by an additional ring 18 that is integral with the main body 3 of the tap with lock nut functions (see FIG. 5).

In substance, the rotatable rings used for connecting the exchanger tap 1 to the refrigeration cycle plant and for connecting the two outlet branches of the exchanger tap to the safety valves not only make it possible to eliminate the problems relating to installation of the exchanger tap, by avoiding the need for the tap to be rotated about its own screwing axis, so occupying a considerable maneuvering space, but they also make it possible to eliminate anaerobic sealants for the joins between the tap and the refrigeration cycle plant and between the tap and the safety valves.

The elimination of anaerobic sealants entails the elimination of problems of coolant gas leakage in the plant as a consequence of degradation over time of such anaerobic sealants.

In practice it has been found that the exchanger tap according to the present invention fully achieves the set aim and objects, in that it makes it possible to obtain the advantages listed above and therefore to solve the problems of the prior art.

The tap thus conceived is susceptible of numerous modifications and variations, all of which are within the scope of the appended claims.

Moreover, all the details may be substituted by other, technically equivalent elements.

In practice, the materials used, as well as the contingent shapes and dimensions, may be any according to the requirements and to the state of the art.

The disclosures in Italian Utility Model application No. 202024000001456 from which this application claims priority are incorporated herein by reference.

What is claimed is:

1. An exchanger tap for refrigeration cycle plants, the exchanger tap comprising a tap body provided with a main body and a secondary body, which are respectively configured to be connected to a first and to a second safety valve, and an inlet configured to be coupled to a refrigeration cycle plant, wherein at least said inlet is provided with a rotatable ring for screwing said exchanger tap to said refrigeration cycle plant, said rotatable ring being rotatable with respect to the tap body, wherein said rotatable ring is kept in a fixed radial position by locking means and wherein said locking means comprise an additional ring which constitutes a lock nut for said rotatable ring.

2. The exchanger tap according to claim 1, wherein said rotatable ring is provided with a pair of O-rings which are configured to ensure a seal between said rotatable ring and an outlet of the exchanger tap.

3. The exchanger tap according to claim 1, wherein said rotatable ring is provided with a threading at an end thereof for screwing into said refrigeration cycle plant.

4. The exchanger tap according to claim 1, wherein said locking means comprise a locking grub screw.

5. The exchanger tap according to claim 1, wherein a rotatable ring is also provided at said main body and at said secondary body of said exchanger tap, at respective controlled safety valves.

6. The exchanger tap according to claim 1, further comprising two steel wires interposed between the tap body and the rotatable ring, which are configured to ensure an axial coupling between the tap body and the rotatable ring.

7. The exchanger tap according to claim 2, wherein said rotatable ring is provided with two further O-rings which are configured to enable a seal between said rotatable ring and said refrigeration cycle plant to which said exchanger tap is intended to be coupled.

* * * * *